United States Patent
Matsumoto

(10) Patent No.: US 10,003,772 B2
(45) Date of Patent: Jun. 19, 2018

(54) VEHICULAR IMAGE CONTROL APPARATUS

(71) Applicant: DENSO CORPORATION, Kariya, Aichi-pref. (JP)

(72) Inventor: Arihiro Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 252 days.

(21) Appl. No.: 14/892,486

(22) PCT Filed: May 20, 2014

(86) PCT No.: PCT/JP2014/002637
§ 371 (c)(1),
(2) Date: Nov. 19, 2015

(87) PCT Pub. No.: WO2014/188706
PCT Pub. Date: Nov. 27, 2014

(65) Prior Publication Data
US 2016/0198126 A1    Jul. 7, 2016

(30) Foreign Application Priority Data

May 22, 2013   (JP) .................................. 2013-108113

(51) Int. Cl.
*H04N 7/18*    (2006.01)
*B60R 1/00*    (2006.01)
*G06F 3/048*   (2013.01)

(52) U.S. Cl.
CPC .............. *H04N 7/181* (2013.01); *B60R 1/00* (2013.01); *G06F 3/048* (2013.01);
(Continued)

(58) Field of Classification Search
CPC . B60R 1/00; B60R 2300/105; B60R 2300/70; B60R 2300/802;
(Continued)

(56) References Cited

U.S. PATENT DOCUMENTS

2003/0222982 A1* 12/2003 Hamdan ................ H04N 7/181
348/148
2005/0030379 A1*  2/2005 Luskin ..................... B60R 1/00
348/148
(Continued)

FOREIGN PATENT DOCUMENTS

JP          H05238311 A      9/1993
JP          2001063500 A  *  3/2001
(Continued)

OTHER PUBLICATIONS

International Search Report and Written Opinion (in Japanese with English Translation) for PCT/JP2014/002637, dated Aug. 19, 2014; ISA/JP.

*Primary Examiner* — Thai Tran
*Assistant Examiner* — Stephen Smith
(74) *Attorney, Agent, or Firm* — Harness, Dickey & Pierce, P.L.C.

(57) ABSTRACT

An audio/visual control apparatus includes a plurality of displays. A reverse driving camera application may be launched to display a camera image dedicated to reverse driving in a situation where another camera application is already running and causing a particular image to be displayed on a subject display of the displays. Such case causes an on-screen image displayed on the subject display to be switched from the particular image to a reverse driving image generated by the reverse driving camera application, regardless of normal display switching priorities.

5 Claims, 6 Drawing Sheets

(52) U.S. Cl.
CPC ..... *B60R 2300/105* (2013.01); *B60R 2300/70* (2013.01); *B60R 2300/802* (2013.01); *B60R 2300/806* (2013.01); *B60R 2300/8033* (2013.01); *B60R 2300/8093* (2013.01)

(58) Field of Classification Search
CPC ...... B60R 2300/8033; B60R 2300/806; B60R 2300/8093; G06F 3/048; H04N 7/181
USPC .................................. 348/148, 118; 701/36
See application file for complete search history.

(56) References Cited

U.S. PATENT DOCUMENTS

| | | | |
|---|---|---|---|
| 2005/0075770 A1* | 4/2005 | Taylor | B60Q 9/005 701/36 |
| 2010/0066518 A1 | 3/2010 | Ohshima et al. | |
| 2010/0245577 A1 | 9/2010 | Yamamoto et al. | |
| 2011/0285848 A1* | 11/2011 | Han | B60R 1/00 348/148 |
| 2012/0105638 A1* | 5/2012 | Englander | B60Q 1/24 348/148 |
| 2012/0162427 A1* | 6/2012 | Lynam | B60R 1/00 348/148 |
| 2013/0013148 A1* | 1/2013 | Park | G07C 5/00 701/36 |
| 2014/0055616 A1* | 2/2014 | Corcoran | B60R 1/00 348/148 |

FOREIGN PATENT DOCUMENTS

| | | |
|---|---|---|
| JP | 2001063500 A | 3/2001 |
| JP | 2007145137 A | 6/2007 |
| JP | 2010028537 A | 2/2010 |
| JP | 2010064750 A | 3/2010 |
| JP | 2010069943 A | 4/2010 |
| JP | 2010221980 A | 10/2010 |
| JP | 2011160346 A | 8/2011 |
| JP | 2012056435 A | 3/2012 |
| JP | 2012093229 A | 5/2012 |
| WO | WO-2006006689 A1 | 1/2006 |

* cited by examiner

FIG. 4
NORMAL EXAMPLE:
DISPLAYING TWO DIFFERENT APPLICATION IMAGES ON TWO DISPLAYS
(a) BEFORE SWITCHING
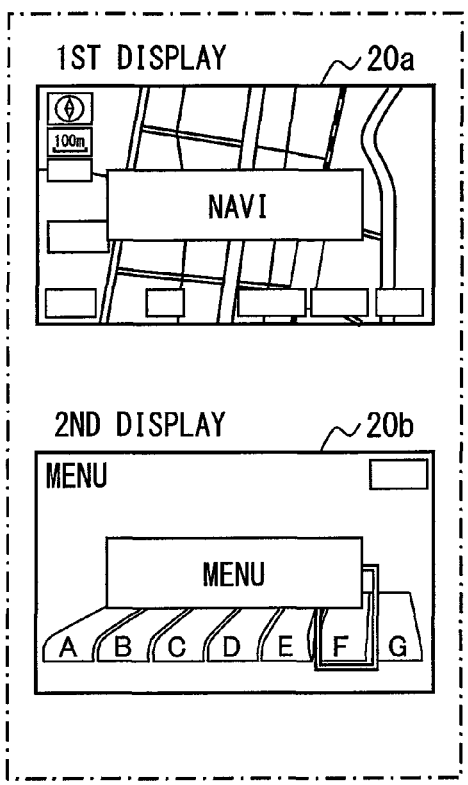
AUDIO FUNCTION ACTIVATED
(b) AFTER SWITCHING
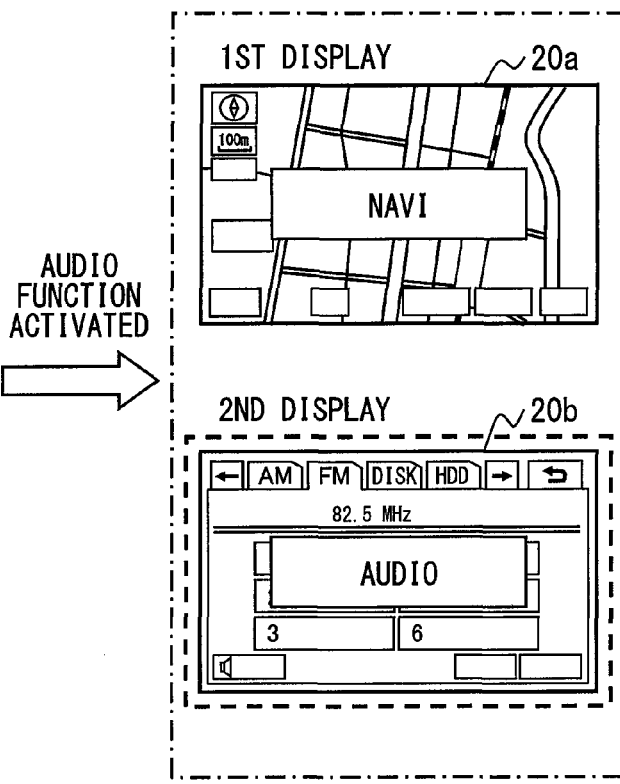

FIG. 5
COMPARATIVE EXAMPLE:
SIMULTANEOUSLY DISPLAYING IMAGES WITH CAMERA MONITORING FUNCTION
(a) BEFORE SWITCHING
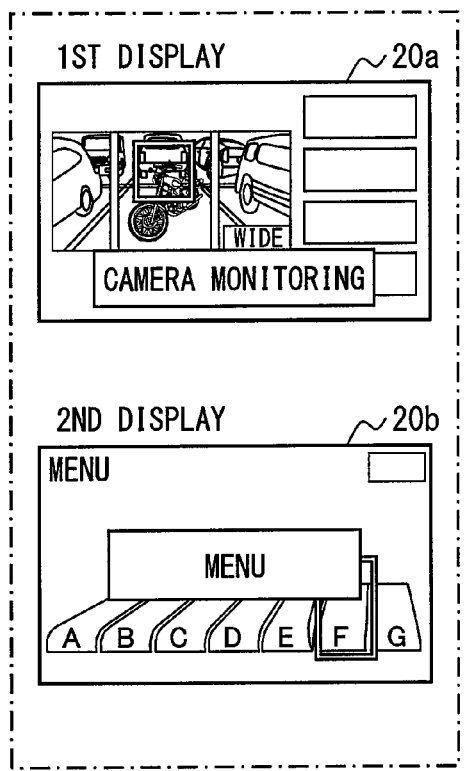
(b) AFTER SWITCHING
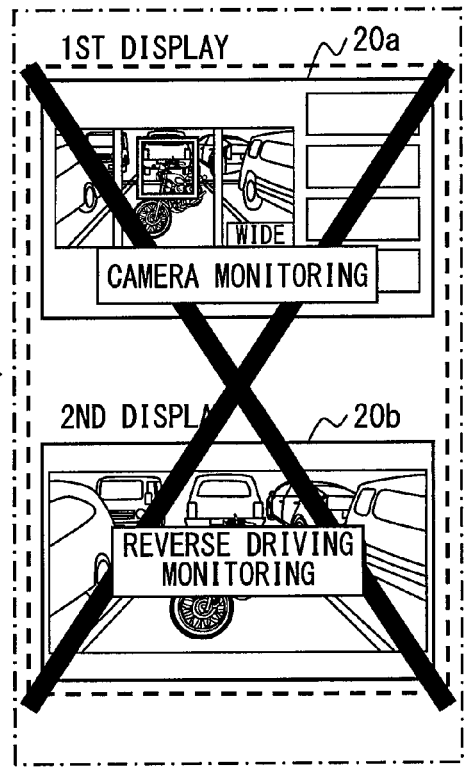

VEHICULAR IMAGE CONTROL APPARATUS

CROSS REFERENCE TO RELATED APPLICATIONS

This application is a U.S. National Phase Application under 35 U.S.C. 371 of International Application No. PCT/JP2014/002637 filed on May 20, 2014 and published in Japanese as WO 2014/188706 A1 on Nov. 27, 2014. This application is based on and claims the benefit of priority from Japanese Patent Application No. 2013-108113 filed on May 22, 2013. The entire disclosures of all of the above applications are incorporated herein by reference.

TECHNICAL FIELD

The present disclosure relates to a vehicular image control apparatus that controls visual output of an application running on an in-vehicle instrument.

BACKGROUND ART

Conventional in-vehicle instruments presenting visual outputs to a user are capable of running a variety of applications such as audio/visual software, navigation software, and rear-view monitor software. A technology that controls the visual outputs from a plurality of applications is disclosed, for example, in Patent Literature 1.

When an output request is generated from a plurality of applications, the technology in Patent Literature 1 adjusts the output to be generated as described below. The technology prepares a table that defines how to handle the visual output of each application, that is, defines what to output, where to output, and how to output. When an output request is generated from a plurality of applications, the technology distributes a visual output resource based on the table to adjust the output to be generated.

PRIOR ART LITERATURES

Patent Literature

Patent Literature 1: JP 2007-145137 A

SUMMARY OF INVENTION

Patent Literature 1 discloses a method of enabling one display (screen) to display visual outputs from two applications. However, the inventors of the present disclosure have found that Patent Literature 1 does not disclose a method of enabling two or more in-vehicle displays (screens) to display visual outputs from applications.

A method, which is available to simultaneously operate a plurality of applications in an in-vehicle system having a plurality of displays, permits, for example, two displays to independently display visual outputs from different applications. However, if applications are independently assigned to a plurality of screens as described earlier, the following situations may arise.

For example, a rear-view monitor application causes a display to display an image captured by a rear-view camera mounted in a vehicle. When the vehicle is driven in reverse, the rear-view monitor application enables a driver of the vehicle to confirm obstacles and passersby behind the vehicle by viewing a displayed image. Such an in-vehicle system may implement a plurality of camera applications each displaying an image (camera image) captured by an in-vehicle camera. If a plurality of displays installed close to each other simultaneously display visual outputs from different camera applications, the point of view of a user attempting to view a camera image is dispersed over the plurality of displays to distract the user. Further, if the camera applications differ in specifications and performance as exemplified below, the user cannot decide which camera image to choose.

Image update intervals may vary from one application to another. Therefore, images captured by the same camera may differ at a certain point of time.

Logos, drawing lines, and other graphic marks displayed over an image captured by a camera may vary from one application to another. Therefore, images captured by the same camera may look different. A certain application may create, for example, a blind spot or an image prone to erroneous recognition.

Applications for cameras capturing a side view or a forward view from the vehicle may be implemented in addition to an application for a rear-view camera. When a plurality of displays simultaneously display images captured by a plurality of different cameras, the user may erroneously recognize a camera image showing a desired view.

An object of the present disclosure is to properly control visual outputs from a plurality of camera applications in an in-vehicle system having a plurality of displays.

According to an example of the present disclosure, an image control apparatus is provided to include a display controller. The display controller distributes a plurality of different visual outputs generated, respectively, by a plurality of different applications that are simultaneously running, to a plurality of image display units separately mounted in the vehicle, and the display controller causes the image display units to display the respective distributed visual outputs. When a plurality of different camera applications outputting respective images captured by a camera mounted in the vehicle are simultaneously running, the display controller causes a visual output to be displayed exclusively in between the different camera applications.

According to the example, even if a system is built to enable a plurality of image display units to independently display a plurality of different visual outputs, visual outputs generated by a plurality of different camera applications will not be simultaneously displayed. This prevents a user from being confused when simultaneously viewing a plurality of different camera images. In the example, a visual output is displayed exclusively in between a plurality of camera applications; however, such exclusive output control is not exercised in between a camera application and another application different from the camera application.

The example, which provides a visual output exclusively in between a plurality of camera applications, can be provided with the following optional configuration. More specifically, at a time when a predefined rear-view display condition becomes established under a situation where a visual output generated by a first camera application is displayed by any one of the image display units, the visual output generated by the first camera application may be turned into a non-displayed state. In contrast, a visual output from a second camera application that is assigned to output an image captured by an in-vehicle rear-view camera may be displayed on any one of the image display units when the rear-view display condition is established.

When a specific rear-view display condition is established, the above-described configuration can switch to a visual output from an associated camera application without fail. Consequently, when, for instance, a vehicle is driven in reverse, a display can be operated to display only a camera image generated by a camera application that provides the most effective driving assistance.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram illustrating an example of on-screen image switching in a two-screen display mode;

FIG. 5 is a diagram illustrating a comparative example of on-screen image switching in the two-screen display mode that is performed to display an image dedicated to reverse driving.

DESCRIPTION OF EMBODIMENTS

An embodiment of the present disclosure will now be described with reference to the accompanying drawings. The present disclosure is not limited to the embodiment described below, but may be implemented by various other embodiments.

[Description of Configuration of Audio/Visual Control Apparatus 10]

Figure 1:
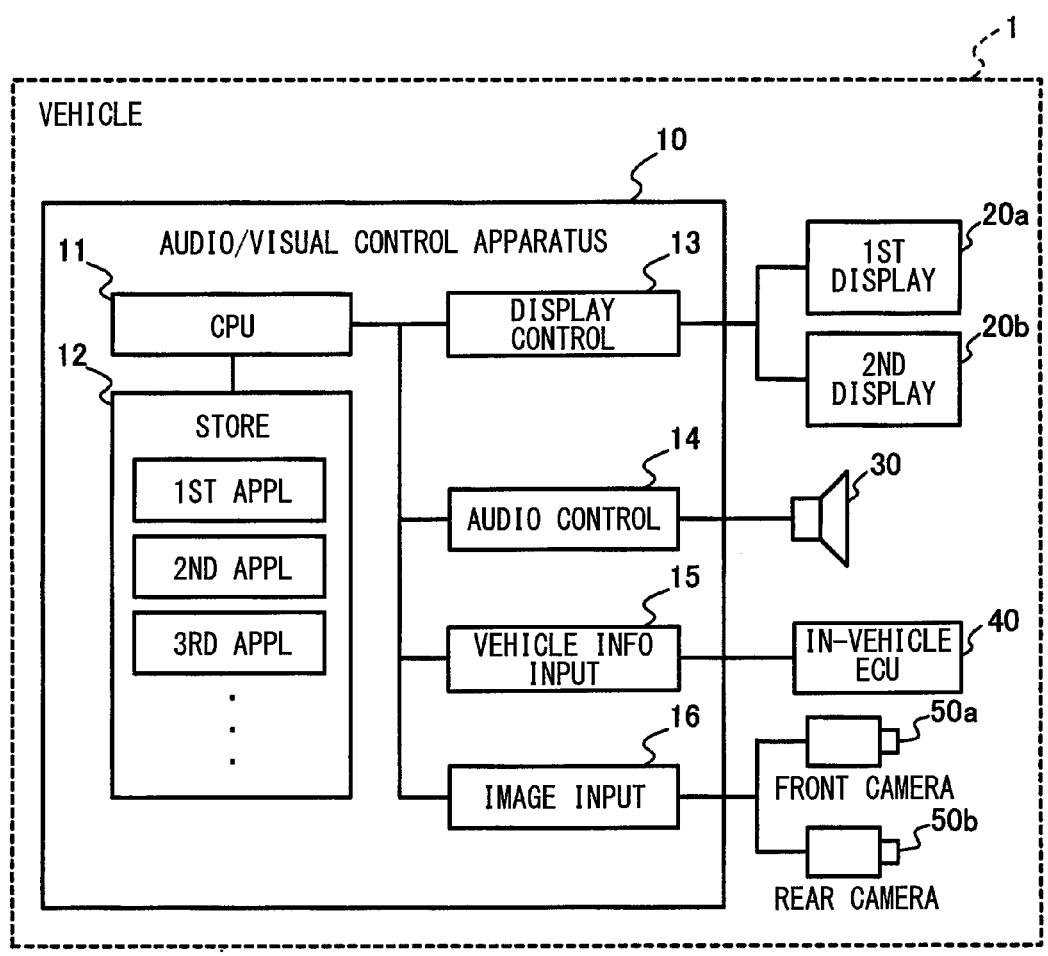
FIG. 1 is a schematic block diagram illustrating a configuration of an audio/visual control apparatus 10.

An audio/visual control apparatus 10 according to the present embodiment is a core control apparatus for an audio/visual system mounted in a vehicle 1. The audio/visual control apparatus 10 is embodied, for instance, by a one-piece audio/visual (AV) navigation apparatus. As illustrated in FIG. 1, the audio/visual control apparatus 10 includes a CPU 11, a storage unit 12, a display control unit 13, an audio control unit 14, a vehicle information input unit 15, and an image input unit 16. The display control unit 13 is connected to two displays 20a, 20b installed in the vehicle 1. When the two displays are to be enumerated on an individual basis, they are referred to as a first display 20a and a second display 20b, respectively. The audio control unit 14 is connected to a loudspeaker 30 installed in the vehicle 1.

The CPU 11 is an arithmetic processing unit that provides overall control of all components of the audio/visual control apparatus 10 in compliance with a program. Based on a program and data of an application read from the storage unit 12, the CPU 11 performs various application processes. Applications executed by the CPU 11 provide, for example, a navigation function, an audio function, a camera monitoring function, and a menu function. Visual outputs and audio outputs from the applications are generated by the first display 20a or the second display 20b and by the loudspeaker 30. The CPU 11 is also referred to as a display controller.

The navigation function is provided by an application that provides route guidance for a vehicle. The navigation function is exercised, for example, to display a map, search for a route, and provide route guidance. An image generated by the navigation function is displayed on the first display 20a or the second display 20b through the display control unit 13. When travel guidance is provided, a guidance message is output in addition to visual information. The guidance message is output from the loudspeaker 30 through the audio control unit 14.

The audio function is provided by an application that outputs audio content based on audio sources such as a CD drive, a hard disk drive, a digital audio player, and radio tuner. The audio function is exercised to let the loudspeaker 30 output audio through the audio control unit 14 based on an audio signal from a user-designated audio source, which is one of a plurality of selectable audio sources. Further, the first display 20a or the second display 20b displays a manipulation menu screen image through the display control unit 13 in order to let a user perform various procedures such as the selection of an output audio source. An on-screen image may be referred to as a window.

The camera monitoring function is provided by an application that displays a camera image captured by an in-vehicle video camera such as a front-view camera 50a or a rear-view camera 50b. The front-view camera 50a captures a front-view image from the vehicle. The rear-view camera 50b captures a rear-view image from the vehicle. The present embodiment assumes that the storage unit 12 stores a plurality of different camera monitoring function programs that are classified according to camera type and use or according to driving assistance function based on camera image. The camera monitoring function programs vary, for instance, in startup conditions for camera image display and in on-screen image design depending on their specifications and performance characteristics.

In the present embodiment, one application is assigned to provide a camera monitoring function that is exercised particularly when the vehicle is driven in reverse. The application displays a camera image dedicated to reverse driving (which may be referred to as an image for reverse driving) based on a rear-view image captured by the rear-view camera 50b. This application is hereinafter referred to as the reverse driving monitoring function. The reverse driving monitoring function, which is used when the vehicle is driven in reverse, is designed to assist the user in confirming obstacles and passersby behind the vehicle. The reverse driving monitoring function is automatically activated when a reverse signal is inputted to indicate that a vehicle's transmission is placed in reverse.

The menu function is provided by an application that displays a menu screen image showing various manipulation options. When the menu function is exercised, a list of manipulation options for manipulating various in-vehicle instruments is displayed as a menu screen image on the first display 20a or the second display 20b.

Whether the first display 20a or the second display 20b displays a visual output from one of the above-described applications is determined as appropriate by the CPU 11 depending on the visual outputs from a plurality of simultaneously running applications. Such determination by the CPU 11 will be described in detail later.

The storage unit 12 is embodied, for instance, by a hard disk drive or rewritable nonvolatile semiconductor memory. The storage unit 12 stores a system program, application programs, and various data such as video and audio content data. The system program and application programs are executed by the CPU 11 to permit the audio/visual control apparatus 10 to operate. The storage unit 12 also stores application programs for the aforementioned navigation function, audio function, camera monitoring function, and menu function.

The display control unit 13 is a visual output interface unit that distributively outputs visual output signals from a plurality of applications executed by the CPU 11 to the first display 20a and the second display 20b for image display purposes. The audio control unit 14 is an audio output interface unit that generates an audible output by outputting audio output signals from a plurality of applications executed by the CPU 11 to the loudspeaker 30.

Each of the first display 20a and the second display 20b, which are also referred to as the image display units, is a color display having a display surface such as a liquid-crystal display panel, and installed within a driver's field of vision and within arm's reach of a driver's seat. Each of the first display 20a and the second display 20b displays images based on visual outputs from various applications executed by the CPU 11. Each of the first display 20a and the second display 20b includes a screen that displays an on-screen image. It can be said that an on-screen image is displayed on the screen. The loudspeaker 30 is an output apparatus that outputs audio into a vehicle compartment based on audio outputs from various applications executed by the CPU 11.

The vehicle information input unit 15, which is also referred to as the acquisition unit, acquires various information from an in-vehicle ECU 40, which is an in-vehicle electronic control apparatus. The present embodiment assumes that the vehicle information input unit 15 acquires a reverse signal indicative of the vehicle's transmission placed in a reverse position from a power train ECU, which is an example of the in-vehicle ECU 40. The image input unit 16 acquires image signals captured by the in-vehicle front-view camera 50a and rear-view camera 50b and inputs the acquired image signals to the CPU 11. A camera image inputted from the image input unit 16 is visually outputted by the camera monitoring function exercised by the CPU 11.

[Overview of Operation of Audio/Visual Control Apparatus 10]

When an application is launched by the audio/visual control apparatus 10, the visual output from the application may be displayed on either the first display 20a or the second display 20b or on both of the first display 20a and the second display 20b. The present embodiment assumes that on-screen images are sequentially displayed on the first display 20a, the second display 20b, the first display 20a, and so on under normal conditions when a plurality of applications are successively launched, and that the older of two currently displayed on-screen images is replaced by an image generated by a newly launched application. Further, when an on-screen image is replaced, the audio output is switched from that of an old application to that of a newly launched application. Alternatively, when a plurality of applications assigned predetermined priorities are successively launched in a situation where two on-screen images are currently displayed, the on-screen image generated by an application having a lower priority than another application may be replaced by the on-screen image generated by a newly launched application.

Under such general rules, let us assume a situation where the first display 20a displays a visual output generated by a first camera monitoring function that displays a camera image captured by one of the front-view camera 50a and the rear-view camera 50b. If, in this situation, a second camera monitoring function is activated to display a camera image captured by the same one of the front-view camera 50a and the rear-view camera 50b, a visual output generated by the second camera monitoring function may be usually displayed on the second display 20b. However, if such a situation arises, the point of view of the user attempting to view a camera image may be dispersed over a plurality of displays to distract the user. Besides, the user cannot decide which camera image to confirm. Under these circumstances, the audio/visual control apparatus 10 avoids the above-mentioned inconvenience by performing a visual output exclusively in between a plurality of camera applications.

If an application to be launched next corresponds to a camera monitoring function in a situation where other applications are running, the audio/visual control apparatus 10 determines whether a currently running application generating a visual output exercises a camera monitoring function. If any currently running application generating a visual output exercises a camera monitoring function, the on-screen image displayed by an earlier-exercised camera monitoring function is replaced by the on-screen image generated by a later-exercised camera monitoring function without regard to the earlier-described normal display switching sequence or priorities.

[Description of Output Switching Process Performed when Reverse Signal is Inputted]

As an example of a process performed by the CPU 11 in the audio/visual control apparatus 10, an output switching process performed when the reverse signal is inputted will now be described with reference to the flowchart of FIG. 2. This process (reverse driving image display process) is performed when the reverse signal is inputted through the vehicle information input unit 15.

In S100, the CPU 11 determines whether a display is displaying a camera image generated by a currently exercised camera monitoring function. If a camera image is being displayed (S100: YES), the CPU 11 proceeds to S102. If, by contrast, no camera image is being displayed (S100: NO), the CPU 11 proceeds to S106.

In S102, which is performed when a camera image is being displayed, the CPU 11 determines whether the currently displayed camera image is a visual output (reverse driving image output) generated by the reverse driving monitoring function, which displays a camera image dedicated to reverse driving. If the currently displayed camera image is not generated by the reverse driving monitoring function (S102: NO), the CPU 11 proceeds to S104. If, by contrast, the currently displayed camera image is generated by the reverse driving monitoring function (S102: YES), the CPU 11 terminates the output switching process.

In S104, which is performed when the currently displayed camera image is not dedicated to reverse driving, the CPU 11 hides a visual output generated by a camera monitoring function that outputs the currently displayed camera image, or turns the visual output into a non-display state. In S106, the CPU 11 causes a predetermined display to display the visual output generated by the reverse driving monitoring function, and then terminates the output switching process.

If the determination in S100 is negative, a display that will display the camera image dedicated to reverse driving is selected in S106 in compliance with the above-described general rules. In other words, when a plurality of applications are simultaneously running, the camera image dedicated to reverse driving replaces either the on-screen image displayed on the first display 20a or the on-screen image displayed on the second display 20b, whichever is older.

If a certain display is not displaying anything, that display may be used to display the camera image dedicated to reverse driving, which is to be newly displayed. If any display is assigned to preferentially display a camera image dedicated to reverse driving, that display may display the camera image dedicated to reverse driving in an interruptive manner. In this instance, an image previously displayed on that display may be transferred to and displayed on the other display.

Meanwhile, if the visual output generated by an earlier-exercised camera monitoring function is hidden in S104, the on-screen image on a display showing the visual output generated by the earlier-exercised camera monitoring function is switched to the camera image (image dedicated to reverse driving) generated by the reverse driving monitoring function. The earlier-exercised camera monitoring function, which is excluded by the above switching, does not terminate, but goes on standby. No display is caused to perform any visual output generated by the camera monitoring function being on standby. Alternatively, the earlier-exercised camera monitoring function excluded by the above switching may terminate its operation.

[Description of Output Switching Process Performed when Reverse Driving Monitoring Function Terminates]

Figure 3:
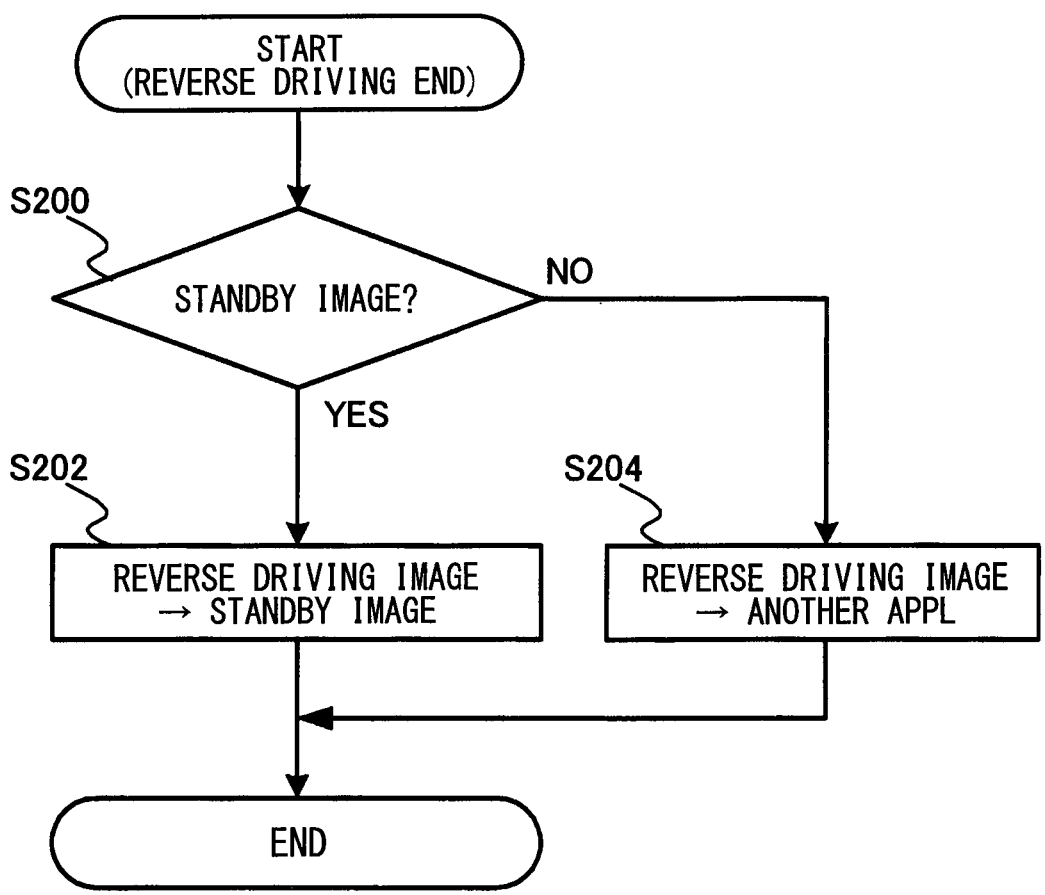
FIG. 3 is a flowchart illustrating an output switching process that is performed at the end of the use of a rear-view monitor dedicated to reverse driving.

As an example of a process performed by the CPU 11 in the audio/visual control apparatus 10, an output switching process performed when the reverse driving monitoring function terminates will now be described with reference to the flowchart of FIG. 3. This process (reverse driving termination process) is performed when the reverse driving monitoring function exercised to generate a camera image dedicated to reverse driving terminates its operation.

In S200, the CPU 11 determines whether a camera monitoring function other than a terminating reverse driving monitoring function is on standby. If such a camera monitoring function is on standby (S200: YES), the CPU 11 proceeds to S202. In S202, the CPU 11 operates so that an on-screen image on a display showing a visual output (reverse driving image output) generated by the terminating reverse driving monitoring function is replaced by a visual output generated by the camera monitoring function placed on standby.

If, by contrast, no camera monitoring function is on standby (S200: NO), the CPU 11 proceeds to S204. In S204, the CPU 11 operates so that the on-screen image on a display showing a visual output generated by the terminating reverse driving monitoring function is replaced by a visual output generated by either the menu function or another predetermined application. In this instance, an on-screen image generated by the predetermined application is assumed to be selected as a default on-screen image and displayed on the display.

[Concrete Examples of On-Screen Image Switching in Two-Screen Display Mode]

Concrete examples of on-screen image switching in a two-screen display mode in the audio/visual control apparatus 10 according to the present embodiment will now be described with reference to FIGS. 4 to 6. In the two-screen display mode, the first display 20a and the second display 20b simultaneously display visual outputs.

(1) Normal Example

FIG. 4 (a) illustrates a situation where the first display 20a shows an image generated by the navigation function and the second display 20b shows an image generated by the menu function. In this situation, let us assume a case where the audio function is newly activated.

In this case, a plurality of camera monitoring functions are not simultaneously exercised. Therefore, on-screen image switching is performed in compliance with general rules. FIG. 4 (b) illustrates a situation encountered when on-screen image switching is performed in the situation illustrated in FIG. 4 (a). In this instance, only the on-screen image on the second display 20b is replaced by an image generated by the newly activated audio function.

(2) Comparative Example

FIG. 5 (a) illustrates a situation where the first display 20a shows a camera image generated by a camera monitoring function and the second display 20b shows an image generated by the menu function. In this situation, let us assume a case where the reverse driving monitoring function is newly activated as an additional camera monitoring function to display an image dedicated to reverse driving.

FIG. 5 (b) illustrates an abnormal display example for comparison purposes. FIG. 5 (b) illustrates a change applied to the situation illustrated in FIG. 5 (a). More specifically, FIG. 5 (b) illustrates a situation where an on-screen image on the second display 20b is replaced by a camera image generated by the newly activated reverse driving monitoring function. In the resulting situation, camera images are simultaneously displayed on the first display 20a and the second display 20b. In this case, however, under the present embodiment of the present disclosure, exclusive control is basically exercised to perform a visual output exclusively in between a plurality of camera monitoring functions; this can prevent the respective visual outputs by the camera monitoring functions from being displayed simultaneously on both of the first display 20a and the second display 20b. Hence, the audio/visual control apparatus 10 according to the present embodiment does not give rise to the situation illustrated in FIG. 5 (b).

(3) Improved Example

Figure 6:
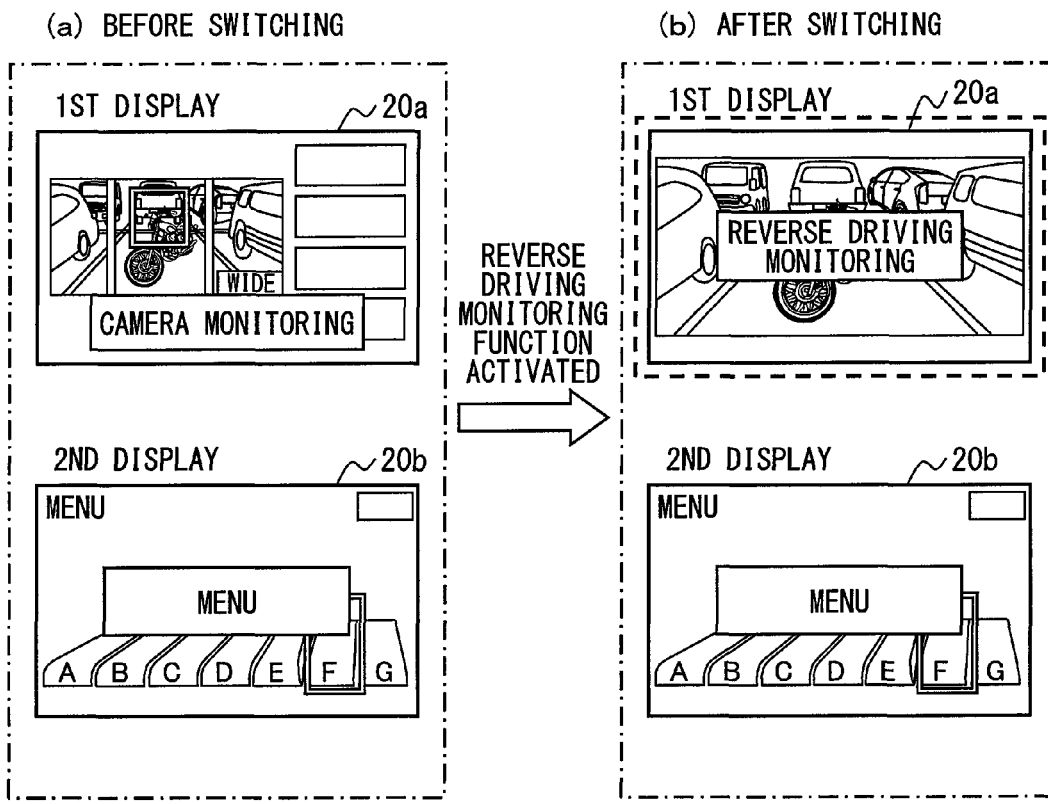
FIG. 6 is a diagram illustrating an example of on-screen image switching in the two-screen display mode that is performed to display an image dedicated to reverse driving.

FIG. 6 (a) illustrates a situation where the first display 20a shows a camera image generated by a camera monitoring function and the second display 20b shows an image generated by the menu function. In this situation, let us assume a case where the reverse driving monitoring function is newly activated as an additional camera monitoring function to display an image dedicated to reverse driving.

In this case, such exclusive control is exercised to allow exclusively one of the visual outputs generated by a plurality of camera monitoring functions. Therefore, a camera image generated by an earlier-exercised camera monitoring function is replaced by a camera image generated by the reverse driving monitoring function without regard to the launching sequence or priorities of previously displayed applications. In this manner, the exclusiveness of visual outputs generated by the camera monitoring functions is maintained. FIG. 6 (b) illustrates a case where a comparative display example of FIG. 5 (b) is improved. The situation illustrated in FIG. 6 (b) arises after on-screen image switching is performed in the situation illustrated in FIG. 6 (a). FIG. 6 (b) illustrates a case where the on-screen image on the first display 20a, which has displayed a camera image generated by an earlier-activated camera monitoring function, is replaced by a camera image (an image dedicated to reverse driving) generated by the reverse driving monitoring function.

[Advantages]

The audio/visual control apparatus 10 according to the foregoing embodiment provides the following advantages.

In a system capable of permitting a plurality of displays to independently display visual outputs generated by a plurality of different applications, a visual output is exclusively performed in between a plurality of camera monitoring functions. More specifically, when a condition for displaying a camera image dedicated to reverse driving is fulfilled (when the reverse signal is input in the foregoing embodiment) in a situation where a camera image is displayed by a first camera monitoring function, the camera image generated by the first camera monitoring function is hidden to display a camera image dedicated to reverse driving (reverse driving image) that is generated by a second camera monitoring function (reverse driving monitoring function). This enables to avoid a situation where camera images generated by a plurality of camera monitoring functions are simultaneously displayed. Consequently, this prevents the user from erroneously recognizing a camera image or being confused by a plurality of camera images.

When a camera image dedicated to reverse driving is displayed by hiding a previously displayed camera image generated by a camera monitoring function, the camera monitoring function generating the hidden camera image is left activated and placed on standby. The camera image generated by the camera monitoring function placed on standby can be immediately redisplayed when the reverse driving monitoring function terminates its operation.

[Modifications]

Figure 2:
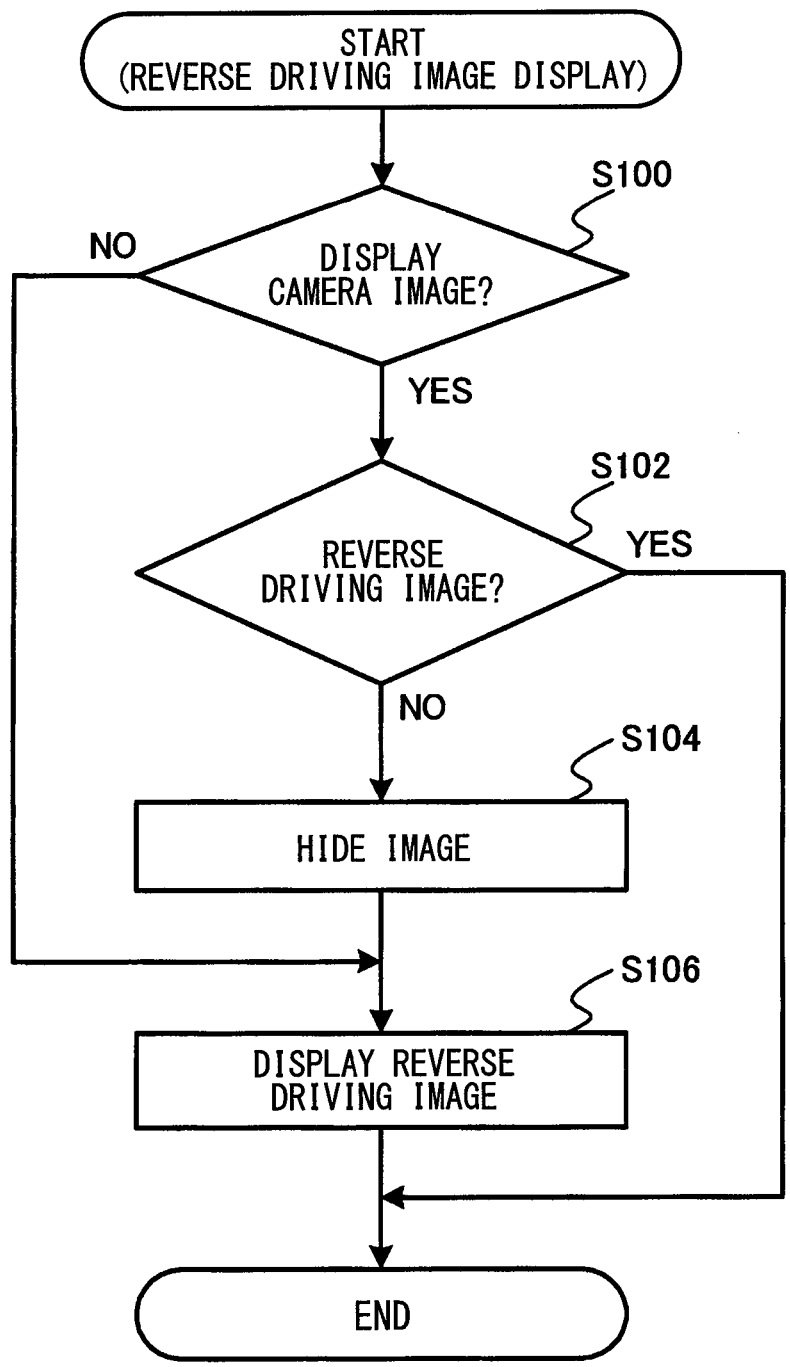
FIG. 2 is a flowchart illustrating an output switching process that is performed when a reverse signal is inputted.

The foregoing embodiment has been described on the assumption that the reverse driving monitoring function is activated to perform the output switching process exemplified in FIG. 2 when the reverse signal is inputted. Alternatively, however, a camera monitoring function for displaying a camera image captured by the rear-view camera 50b may be activated when an obstacle is detected by a rear sensor that detects an obstacle behind the vehicle. The present disclosure is also applicable to the above alternative scheme. More specifically, a predetermined camera monitoring function for displaying an image captured exclusively by a rear-view camera is activated when an obstacle detection signal is inputted from the rear sensor. In this instance, a previously displayed camera image is hidden to switch to a camera image generated by the activated predetermined camera monitoring function.

The foregoing embodiment and its modifications have been described on the assumption that two displays are installed. However, the present disclosure is also applicable to a system in which more than two displays are installed. Further, various displays including a head-up display (HUD) and a projector are applicable to the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular image control apparatus to a vehicle, comprising:
   a display controller configured to
      distribute a plurality of different visual outputs generated, respectively, by a plurality of different applications that are simultaneously running, to a plurality of image display units separately mounted in the vehicle and
      cause the image display units to display the respective distributed visual outputs,
   wherein:
      (i) the different applications include a plurality of different camera applications corresponding to a single subject camera mounted in the vehicle that are able to be simultaneously executed;
      (ii) the plurality of different camera applications generating respective visual outputs of images captured by the single subject camera includes
         (a) a second camera application generating a second visual output, the second camera application being executed to display the second visual output in response to a predetermine display condition becoming established, and
         (b) a first camera application generating a first visual output, the first camera application being any one of the different camera applications excluding the second camera application; and
      (iii) the display controller is configured to
         (a) replace the first visual output generated by the first camera application with the second visual output generated by the second camera application by hiding the first visual output from any one of the screens of the image display units, and
         (b) cause any one of the screens of the image display units to display the second visual output generated by the second camera application, in response to the predetermined display condition becoming established under a situation where the first visual output generated by the first camera application corresponding to the subject camera is
            displayed on any one of the screens of the image display units,
         the display controller causes one of the visual outputs that are respectively generated by the plurality of different camera applications corresponding to the single subject camera to be exclusively displayed.

2. The vehicular image control apparatus according to claim 1, wherein;
   the single subject camera mounted in the vehicle is a rear-view camera capturing a rear view of the vehicle; and
   in response to a predetermined rear-view display condition, as the predetermined display condition, becoming established under a situation where the first visual output generated by the first camera application among the different camera applications corresponding to the rear-view camera is displayed on one of the image display units,
   the display controller
      hides the first visual output generated by the first camera application and
      causes any one of the screens of the image display units to display the second visual output generated by the second camera application,
         the second camera application being assigned, among the different camera applications corresponding to the rear-view camera, to generate a visual output of an image captured by the rear-view camera mounted in the vehicle in response the rear-view display condition becoming established.

3. The vehicular image control apparatus according to claim 2, further comprising:
   an acquisition unit that acquires a signal indicative of a shift position of the vehicle,
   wherein, when the acquisition unit acquires a signal indicative of the shift position becoming a reverse shift position, the display controller determines that the rear-view display condition is established.

4. The vehicular image control apparatus according to claim 2, wherein,
when the second camera application stops an operation, the operation having continued generating the second visual output to the any one of the image display units while the rear-view display condition is established,
the display controller causes one of the image display units to redisplay a first visual output generated by the first camera application.

5. The vehicular image control apparatus according to claim 1, further comprising:
a storage unit that stores the plurality of applications.

* * * * *